(12) United States Patent
Maddox et al.

(10) Patent No.: US 7,819,649 B2
(45) Date of Patent: Oct. 26, 2010

(54) APPARATUS FOR BLOW MOLDING

(75) Inventors: A. Dale Maddox, Tecumseh, MI (US);
Robert J. Irish, Manchester, MI (US)

(73) Assignee: Milacron LLC, Batavia, OH (US)

( * ) Notice: Subject to any disclaimer, the term of this patent is extended or adjusted under 35 U.S.C. 154(b) by 466 days.

(21) Appl. No.: 12/053,558

(22) Filed: Mar. 22, 2008

(65) Prior Publication Data
US 2009/0238910 A1    Sep. 24, 2009

(51) Int. Cl.
*B29C 49/04* (2006.01)
*B29C 49/58* (2006.01)
*B29C 49/76* (2006.01)

(52) U.S. Cl. .................. 425/182; 425/525; 425/532; 425/535

(58) Field of Classification Search .................. 425/182, 425/525, 532, 535
See application file for complete search history.

(56) References Cited

U.S. PATENT DOCUMENTS

| | | | |
|---|---|---|---|
| 3,907,475 A | 9/1975 | Bowers | |
| 4,234,299 A | 11/1980 | Kuenzig et al. | |
| 4,954,071 A * | 9/1990 | Austin | 425/531 |
| 5,256,055 A | 10/1993 | Morris | |
| 5,603,966 A | 2/1997 | Morris et al. | |
| 5,629,032 A * | 5/1997 | Pennino | 425/168 |
| 5,656,214 A * | 8/1997 | Uchiyama et al. | 264/40.1 |
| 5,971,741 A | 10/1999 | Weber | |
| 6,824,732 B2 | 11/2004 | Cobiski et al. | |

* cited by examiner

*Primary Examiner*—Robert B Davis
(74) *Attorney, Agent, or Firm*—John W. Gregg

(57) ABSTRACT

A blow molding apparatus wherein an extruded tubular parison is pressurized to form a molded article, comprises a blow pin for introducing pressurized fluid into the parison, an actuator for advancing and retracting the blow pin and adjusting means for determining the orientation of the actuator to achieve substantial parallelism of a blow pin shaft to which the blow pin is attached and a centerline of the opening through a forming die through which the blow pin shaft passes and to achieve substantial parallelism of a sealing element of the blow pin with a plane transverse to the opening of the parison.

11 Claims, 6 Drawing Sheets

APPARATUS FOR BLOW MOLDING

BACKGROUND OF THE INVENTION

1. Field of the Invention

This invention relates generally to blow molding and in particular to so called "extrusion" blow molding where a parison from which an article is to be blow molded is produced by extrusion of material in a flowable condition through a forming die and the extruded parison is expanded within a mold cavity by introduction of pressurized fluid into the parison.

2. Description of Related Art

Blow molding is a cyclic process wherein a parison of material in a flowable condition is centered on the parting plane of a mold assembly defining a mold cavity, the mold assembly is closed around the parison, the parison is expanded so the exterior of the parison abuts molding surfaces of the mold cavity, the blow molded article is conditioned to be sufficiently rigid to retain its size and shape while unsupported, the mold assembly is opened and the blow molded article is removed. In general, the flowable condition of the parison is achieved when the material of the parison is at an elevated temperature, and the rigid condition of the blow molded article is achieved when the temperature of the material of the article has been reduced. A blow molding machine comprises a press for opening and closing the mold assembly and blowing means for introducing a pressurized fluid (typically air) to expand the parison within the mold cavity. In so called extrusion blow molding, a tubular parison is formed by passing material in a flowable condition through a forming die and the mold assembly is closed on the tubular parison so as to close the parison except for an opening for introduction of pressurized fluid.

To introduce pressurized fluid into an extruded parison, a so called blow pin is introduced through the opening in the parison, the blow pin comprising a passage there through in fluid communication with a source of pressurized fluid and with the interior of the parison. The blow pin seals the opening of the parison so as to prevent pressurized fluid bypassing the blow pin. The blow pin is attached to a blow pin shaft passing through an opening through the forming die interiorly of the channel through which material is extruded and rigidly connected to an actuator rod to effect translation of the blow pin shaft. It is known to provide adjusting devices affecting the lateral position of the blow pin shaft relative to the centerline of the mold cavity. However, in known constructions as described, lack of parallelism between the centerline of the forming die and the blow pin shaft can result in misalignment of the blow pin at the opening of the parison. Such misalignment can result in damage to the blow pin, perforation of the parison where the blow pin forms a seal with the parison or an inadequate seal permitting pressurized fluid to by-pass the blow pin causing incomplete expansion of the parison. Further, misalignment can cause binding of the blow pin shaft with the opening through which it passes as the blow pin shaft is translated between a retracted position and an advanced position. Lack of parallelism may result from, for example, a rod of an actuator for moving the blow pin not being perpendicular to the actuator rod bearings; a mounting face of the actuator not being flat and/or perpendicular to the actuator rod and actuator rod bearings; support of the actuator mounting not being perpendicular to the centerline of the forming die; lack of concentricity of the blow pin shaft with the actuator rod as the blow pin shaft is connected to the actuator rod; lack of concentricity of the blow pin relative to the blow pin shaft as the blow pin is supported on the blow pin shaft; and, lack of straightness of the blow pin shaft. Hence, there is a need for an improved construction to achieve parallelism of the blow pin shaft with the centerline of the opening through the forming die and to achieve desired alignment of the blow pin with the opening of the parison.

SUMMARY OF THE INVENTION

It is an object of the present invention to provide a blow molding apparatus wherein an extruded tubular parison is pressurized to form a molded article, the apparatus comprising a blow pin for introducing pressurized fluid into the parison, an actuator for advancing and retracting the blow pin and adjusting means for determining the orientation of the actuator to achieve substantial parallelism of a blow pin shaft to which the blow pin is attached and a centerline of the opening through a forming die through which the blow pin shaft passes and to achieve substantial parallelism of a sealing element of the blow pin with a plane transverse to the opening of the parison.

It is a further object of the present invention to provide said blow molding apparatus wherein the adjusting means comprise at least three adjusting members, each adjusting member suitable for establishing an offset relative to a reference surface, the offset contributing to orientation of the actuator.

It is a further object of the present invention to provide said blow molding apparatus wherein each adjusting member comprises a threaded portion engaged with at least one of an actuator mounting member to which the actuator is attached and a support member so that rotation of the adjusting member is converted to relative translation of the actuator mounting member and support member whereby the offset of the actuator mounting member from the support member is established.

Further objects and advantages of the invention shall be made apparent from the accompanying drawings and the following description thereof.

In accordance with the aforesaid objects the present invention provides an apparatus for blow molding wherein a tubular parison extruded from material passing through an annular opening of a forming die is captured in a mold assembly comprising a mold cavity so as to close one end of the parison to permit expansion thereof by pressurizing the parison within the mold cavity, the apparatus comprising a blow pin for conducting the pressurized fluid from a source thereof into the parison, an actuator comprising an actuator rod for advancing the blow pin to an advanced position achieving sealing engagement of the blow pin and an opening in the parison and for retracting the blow pin to a retracted position removed from the opening in the parison, a blow pin shaft supporting the blow pin and connected to the actuator rod and passing through the forming die internally of the annular opening thereof and adjusting means for determining the orientation of the actuator to achieve substantial parallelism of the blow pin shaft and the centerline of the opening through the forming die through which the blow pin shaft passes and to achieve substantial parallelism of a sealing element of the blow pin with a plane transverse to the opening of the parison. In accordance with the invention, the adjusting means comprise at least three adjusting members interposed between the actuator and the forming die, each adjusting member suitable for establishing an offset relative to a reference surface, the offset contributing to orientation of the actuator.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
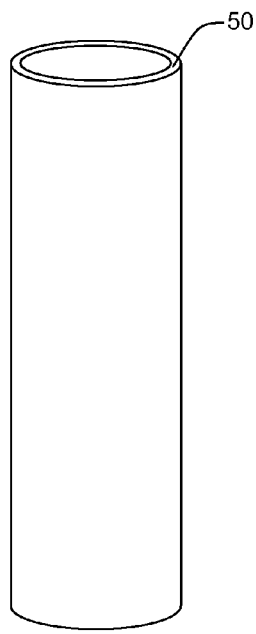
FIGS. 1a and 1b illustrate a tubular parison and finished container, respectively, of an extrusion blow molding process.
Figure 1B:
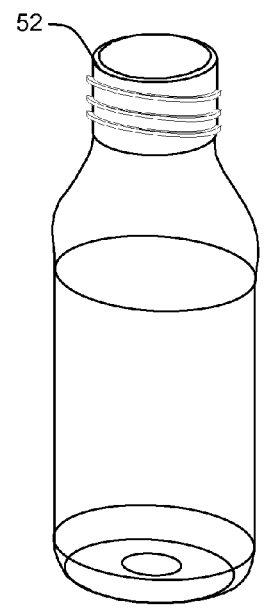

An extrusion blow molding process in accordance with the invention expands an extruded tubular parison to produce, for example, a finished container. Extrusion of material through a forming die is effected to produce an extruded parison of desired shape, size and wall thickness to produce the desired molded article. A tubular parison 50 is shown in FIG. 1a and a container 52 produced by expansion of the tubular parison is shown in FIG. 1b. The extruded material remains flowable following extrusion due to retained heat. A mold assembly is closed around parison 50 and blow molding commences with closure of the mold assembly. During blow molding, pressurization of parison 50 is effective to expand parison 50 radially to abut molding surfaces of the closed mold assembly, the molding surfaces defining the exterior of container 52. Following expansion, the material of container 52 is conditioned (cooled) to become sufficiently rigid for removal from the mold assembly. Cooling may be effected by circulation of a heat transfer fluid within members of the mold assembly through channels proximate to the molding surfaces whereby heat is transferred from the material of container 52 to the heat transfer fluid.

Figure 2:
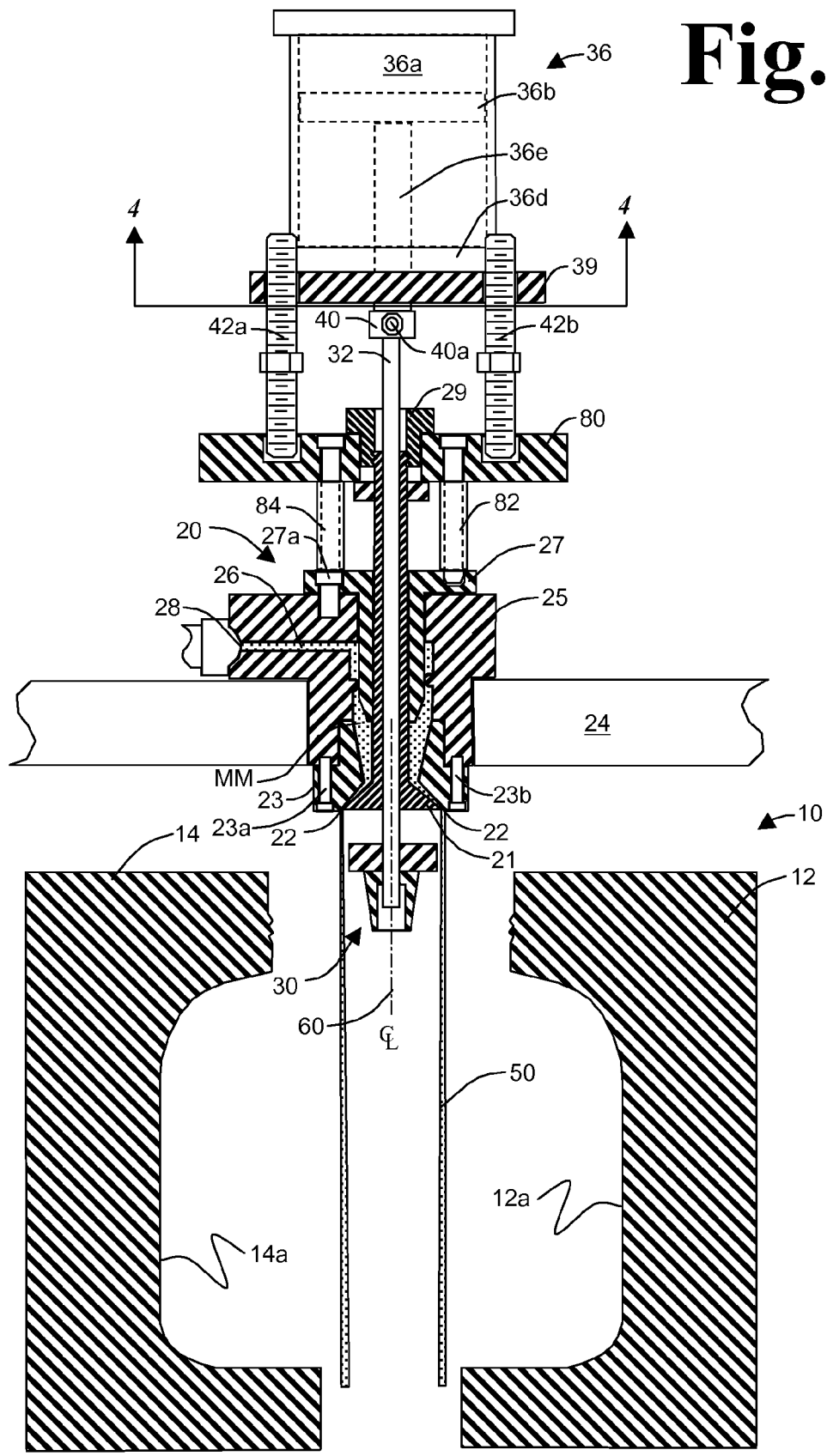
FIG. 2 illustrates a blow molding apparatus according to the invention with the blow pin at a retracted position and an extruded parison in the gap between mold components.
Figure 3:
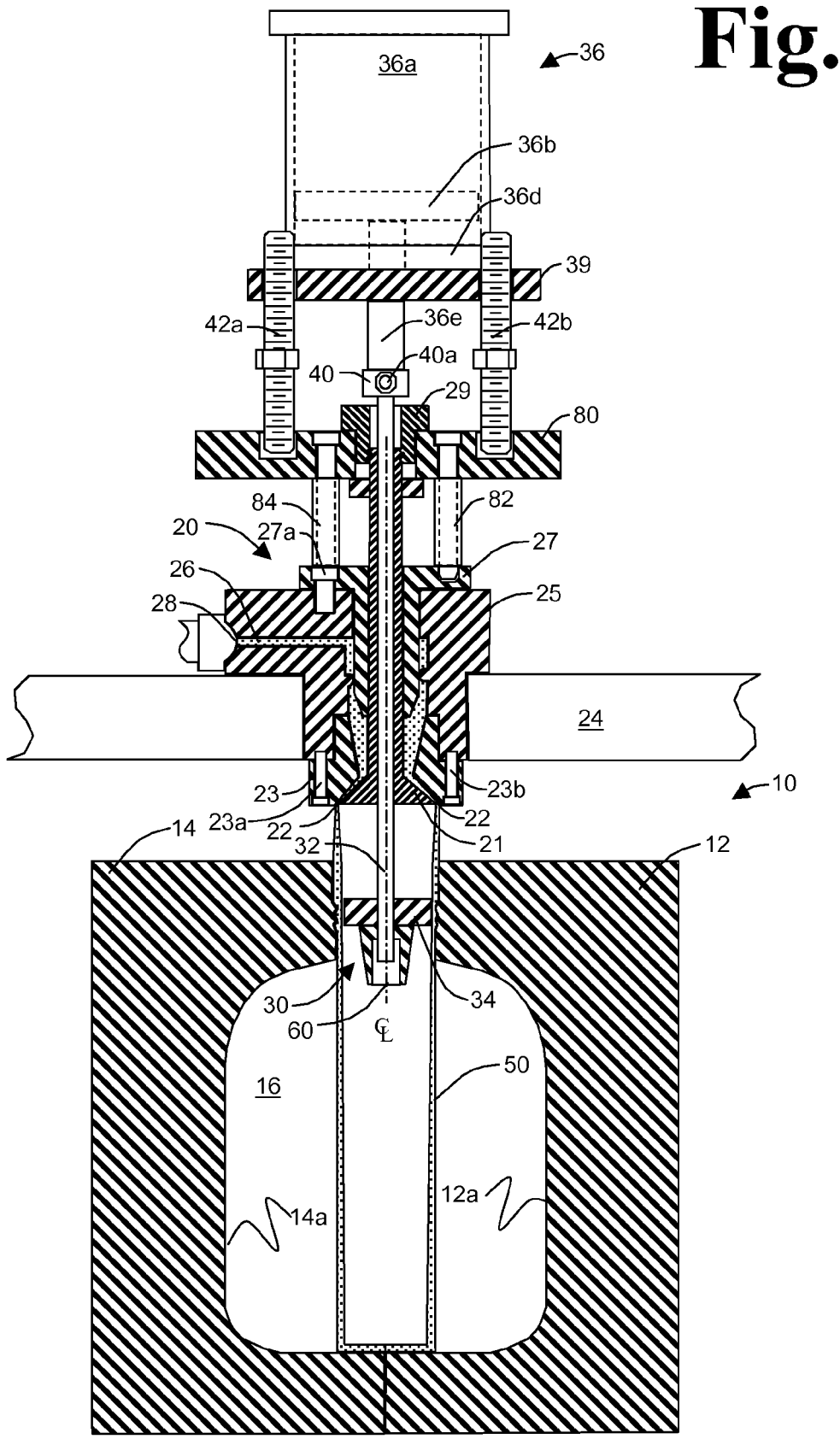
FIG. 3 illustrates the blow molding apparatus of FIG. 2 with the blow pin in an advanced position in sealing engagement with an opening in the parison and the mold components abutting at the parting line of a mold assembly.

Referring to FIGS. 2 and 3, a mold assembly 10 comprises mold components 12 and 14 comprising molding members having molding surfaces 12a and 14a such that with mold components 12 and 14 abutted, a mold cavity 16 (FIG. 3) is defined by the molding surfaces. A tubular parison, such as tubular parison 50 is produced by forcing flowable material through an annular gap 22 of die assembly 20. Tubular parison 50 is shown depending from annular gap 22 in the space between mold components 12 and 14. The lower end of tubular parison 50 extends below the lowest extent of the molding surfaces 12a and 14a so that when mold components 12 and 14 are brought into abutting contact, the lower end of tubular parison 50 is pinched closed by the opposing surfaces of mold components 12 and 14.

Continuing with reference to FIG. 2, die assembly 20 comprises forming die 23, die block 25, mandrel sleeve 27 and mandrel 21. Forming die 23 comprises a double tapered opening there through, a first taper reduces the cross sectional area of the opening from the inlet thereof and the second taper expands the cross sectional area at the outlet thereof. The end of mandrel 21 proximate the outlet of forming die 23 comprises a flared portion defining annular gap 22 between mandrel 21 and the outlet of forming die 23. A continuous channel 26 (shown filled with material MM) through die block 25 and surrounding mandrel sleeve 27 conveys flowable material from inlet 28 to the annular gap between mandrel 21 and the outlet of forming die 23. Flowable material may be supplied to inlet 28 of die assembly 20 from an extruder or accumulator (not shown). Relative longitudinal position of the flared portion of mandrel 21 and the outlet of forming die 23 is adjustable so as to change the width of annular gap 22 through which flowable material exits forming die 23. Forming die 23 is fixed to die block 25 by, for example fasteners such as fasteners 23a and 23b and die block 25 is fixed to die head plate 24 by fasteners (not shown). Adjustment of relative longitudinal position of mandrel 21 and forming die 23 is effected using an adjusting nut 29 engaging threads of the end of mandrel 21 opposite the end proximate the outlet of forming die 23. Adjusting nut 29 is supported on mandrel adjust plate 80 so as to permit locking of angular orientation of nut 29. As relative longitudinal position of mandrel 21 and forming die 23 is achieved by the extent of engagement of threads of mandrel 21 with adjusting nut 29, locking of angular orientation sets a relative longitudinal position of mandrel 21 and the outlet of forming die 23, whereby width of annular gap 22 is set. Mandrel adjust plate 80 is attached to mandrel sleeve 27 by fasteners passing through spacers 82 and 84, mandrel sleeve 27 is attached to die block 25 by fasteners such as fastener 27a. As illustrated, mandrel adjust plate 80 is supported so as to provide separation between mandrel adjust plate 80 and die assembly 20. While such separation is known, other arrangements of die assembly 20 and mandrel adjust plate 80 are contemplated where the separation is greatly reduced or eliminated.

Continuing with reference to FIG. 2, blow pin 30 is shown in a retracted position proximate forming die 23 and is within the interior of parison 50. Blow pin 30 is supported by tubular blow pin shaft 32 passing through mandrel 21. Blow pin shaft 32 is rigidly connected to actuator rod 36e by an adaptor 40 comprising a fitting 40a for admission of pressurized fluid conveyed through adaptor 40 to the interior of tubular blow pin shaft 32. Actuator 36 is effective to translate blow pin shaft 32 to move blow pin 30 between the retracted position shown in FIG. 2 and an advanced position in preparation for expansion of parison 50 into a molded article. Actuator 36 is supported relative to mandrel adjust plate 80 to provide separation at least sufficient to accommodate the range of translation of air adaptor 40 without interference with adjusting nut 29 or devices associated with locking angular orientation thereof. Actuator 36 is advantageously a conventional pneumatic or hydraulic actuator comprising cylinder 36a, cylinder base 36d and a piston 36b (shown in phantom (dashed) in FIGS. 2 and 3) internal to cylinder 36a. Piston 36b separates portions of the internal volume of cylinder 36a and is displaced within cylinder 36a by differential force applied to opposite sides of the piston from pneumatic or hydraulic fluid admitted to the separated portions of the internal volume of cylinder 36a. Actuator 36 is attached to an actuator mounting member such as actuator mounting plate 39 by fasteners (not shown) and actuator mounting plate 39 is supported from a support member such as mandrel adjust plate 80 by adjusting screws such as adjusting screws 42a and 42b that engage both actuator mounting plate 39 and mandrel adjust plate 80. Actuator rod 36e is fixed to piston 36b and supported by at least one bearing such as bearing 36c in cylinder base 36d (FIG. 4) permitting actuator rod 36e to slide relative to cylinder 36a along the longitudinal axis of actuator rod 36e. Fitting of the piston within cylinder 36a and of actuator rod 36e through the bearings are effective to establish the direction of travel of actuator rod 36e. Other conventional actuators can be used, whether operated hydraulically, pneumatically, or electrically.

Referring to FIG. 3, the construction of FIG. 2 is illustrated with mold components 12 and 14 in abutting contact and the lower end of parison 50 pinched closed between the opposing faces of mold components 12 and 14 sealing that end of parison 50. Prior to mold closure, actuator 36 is operated to position blow pin 30 to an advanced position. With closure of the mold, a sealing element such as collar 34 comprising blow pin 30 contacts parison 50 at a narrowing of a neck portion of mold cavity 16. Advantageously, the narrowing of the neck portion of mold cavity 16 may include surface features for forming a so-called neck "finish" for affixing a closure to the upper end of the article being blow molded, illustrated as ridges and valleys of a screw thread in FIG. 3. In such applications, support of the parison neck by collar 34 provides reaction forces effective for formation of the neck "finish". Contact of collar 34 with parison 50 is effective to seal the interior of parison 50 at blow pin 30. Pressurized fluid is conducted from adaptor 40 through blow pin shaft 32 and vented proximate blow pin 30 to the interior of parison 50 to effect expansion thereof, bringing the exterior of parison 50 into abutting contact with molding surfaces 12a and 14a. Advantageously, mold components 12 and 14 comprise shearing members (not shown) that are effective to shear parison 50 proximate the upper end of collar 34.

With rigid connection of blow pin shaft 32 to actuator rod 36e of actuator 36, sealing of parison 50 at collar 34 of blow pin 30 requires that collar 34 be substantially perpendicular to the sidewalls of the neck portion of mold cavity 16. Cocking of collar 34 relative to the neck region of mold cavity 16 where sealing engagement with sidewalls of parison 50 is to be achieved could permit pressurized fluid to bypass blow pin 30 resulting in incomplete expansion of parison 50 and consequent molding of an article that is unacceptable for its intended purpose. In addition, non-parallelism of blow pin shaft with centerline 60 of mandrel 21 and the opening through mandrel 21 through which blow pin shaft 32 passes can result in binding of blow pin shaft 32 within mandrel 21.

Figure 4:
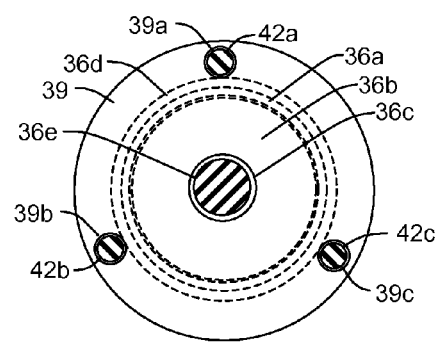
FIG. 4 is a view of the base of the blow pin actuator taken along the line 4-4 of FIG. 2.

An arrangement for mounting blow pin actuator 36 to achieve a desired orientation of actuator 36 and blow pin shaft 32 shall be described with reference to FIGS. 4, 5 and 6. To permit alignment of blow pin shaft 32 to achieve substantial parallelism with centerline 60 of the passage through mandrel 21 through which blow pin shaft 32 passes and substantial parallelism of collar 34 to a plane transverse to the neck portion of mold cavity 16, at least three adjusting members such as such as adjustable supports 42a and 42b are interposed between actuator 36 and die assembly 20. As seen in FIG. 4, adjustable supports 42a, 42b and 42c are spaced around the perimeter of actuator mounting plate 39 so as to be effective to determine the angular orientation AA of mounting plate 39 relative to a horizontal plane parallel to die head plate 24. Adjustable supports 42a, 42b, and 42c are of sufficient length to achieve the desired minimum separation between actuator mounting plate 39 and mandrel adjust plate 80 to accommodate translation of air adaptor 40. Although illustrated in the plane of FIG. 5, angle AA of tilt of mounting plate 39 relative to a horizontal plane may be measured in any radial plane through the axial centerline 62 of actuator 36, orientation of the plane of mounting plate 39 can be completely defined by angles AA of tilt in two planes perpendicular to each other and both perpendicular to a reference plane (horizontal as shown). Further, although three adjustable supports are sufficient to determine the magnitude of two such angles AA, four adjustable supports may be used and arranged so that the centerlines of no more than two adjustable supports lie in the same plane.

Orientation of the plane in which actuator mounting plate 39 lies, and hence, orientation of actuator 36, is determined by lengths of at least three offsets from a reference surface, each contributing to orientation of actuator 36, provided not all three offsets lie in the same plane. Offsets such as offsets 72a and 72b (FIG. 5) between actuator mounting plate 39 and a reference surface such as mandrel adjust plate 80 are determined by the relative positions of mandrel adjust plate 80 and actuator mounting plate 39 along the lengths of adjustable supports 42a, 42b and 42c (42a and 42b shown in FIG. 5). Each adjustable support comprises two threaded portions such as threaded portions 41b and 43b of adjustable support 42b (FIG. 6). Threads of the threaded portions of each adjustable support are of opposite orientation, that is, threads of one threaded portion of each adjustable support are "right-handed" and threads of the other threaded portion of each adjustable support are "left handed". Threads of one threaded portion of each adjustable support engage threads in a bore in mandrel adjust plate 80 and threads of the other threaded portion of each adjustable support engage threads in a bore in actuator mounting plate 39 (bores 20a and 20b in mandrel adjust plate 80 (FIG. 5) receive threaded portions of adjustable supports 42a and 42b, respectively). Rotation of an adjustable support is effective to translate actuator mounting plate 39 relative to mandrel adjust plate 80 as represented by arrows 70a and 70b, thereby establishing the length of an offset associated with that adjustable support. By virtue of the construction of actuator 36, orientation of actuator mounting plate 39, as represented by angle AA, determines orientation of the centerline 62 of actuator 36 and of actuator rod 36e. Further, as a consequence of rigid connection of blow pin shaft 32 to actuator rod 36e, orientation of actuator mounting plate 39 determines orientation of blow pin shaft 32 relative to centerline 60 as represented by angle BB. Just as two angles AA lying in perpendicular planes are sufficient to define orientation of actuator mounting plate 39, two angles BB lying in perpendicular planes, are sufficient to define orientation of centerline 62. Still further, as a consequence of attachment of blow pin 30 to blow pin shaft 32, orientation of actuator mounting plate 39 determines orientation of collar 34 relative to a plane transverse to the neck region of mold cavity 16 as represented by angle CC. Just as two angles BB lying in perpendicular planes are sufficient to define orientation of centerline 62, two angles CC lying in perpendicular planes are sufficient to define orientation of collar 34. Lengths of the offsets, such as offsets 72a and 72b are set to establish an orientation of actuator mounting plate 39 to achieve substantial parallelism of collar 34 to a transverse plane through the neck portion of mold cavity 16 and substantial parallelism of blow pin shaft 32 with centerline 60.

Figure 6:
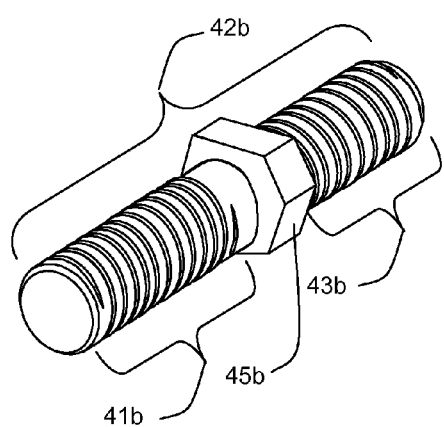
FIG. 6 is an enlarged view of an adjusting member of the apparatus of FIG. 5.
Figure 5:
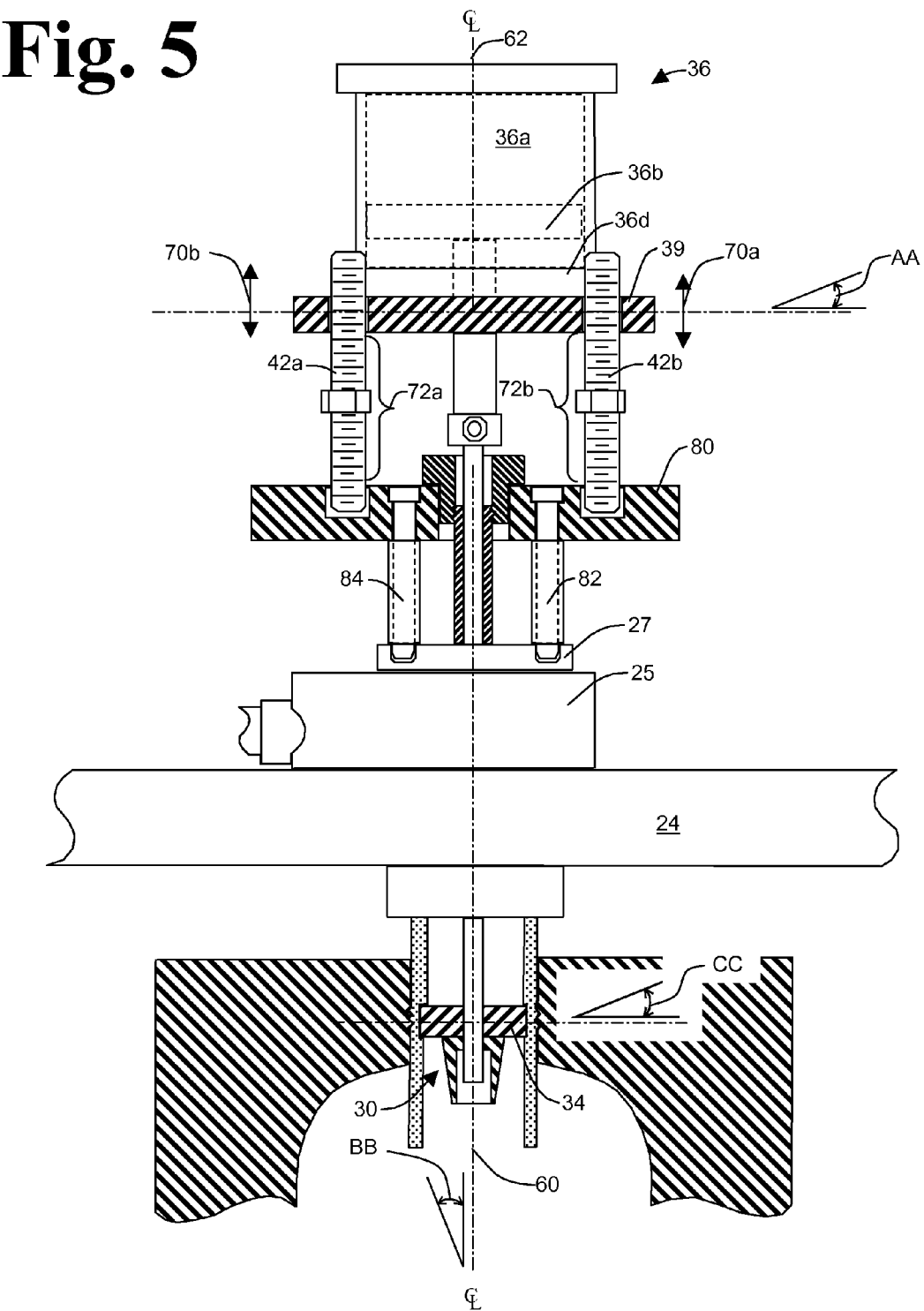
FIG. 5 is an enlarged view of an arrangement for mounting a blow pin actuator according to the invention illustrating orientation of the blow pin.

Continuing with reference to FIGS. 4, 5 and 6, gripping of each adjustable support 42a, 42b and 42c for rotation thereof is advantageously facilitated by one or more flats comprising a grip segment such as grip segment 45b of adjustable support 42b (FIG. 6). Rotation of an adjustable support about its longitudinal axis in one direction, for example clockwise, is effective to reduce the length of the associated offset; and, rotation of an adjustable support about its longitudinal axis in the opposite direction is effective to increase the length of the associated offset. The direction of rotation effective to increase or decrease the length of the offset is determined by the orientation of threads of threaded portions of the adjustable support.

Figure 7:
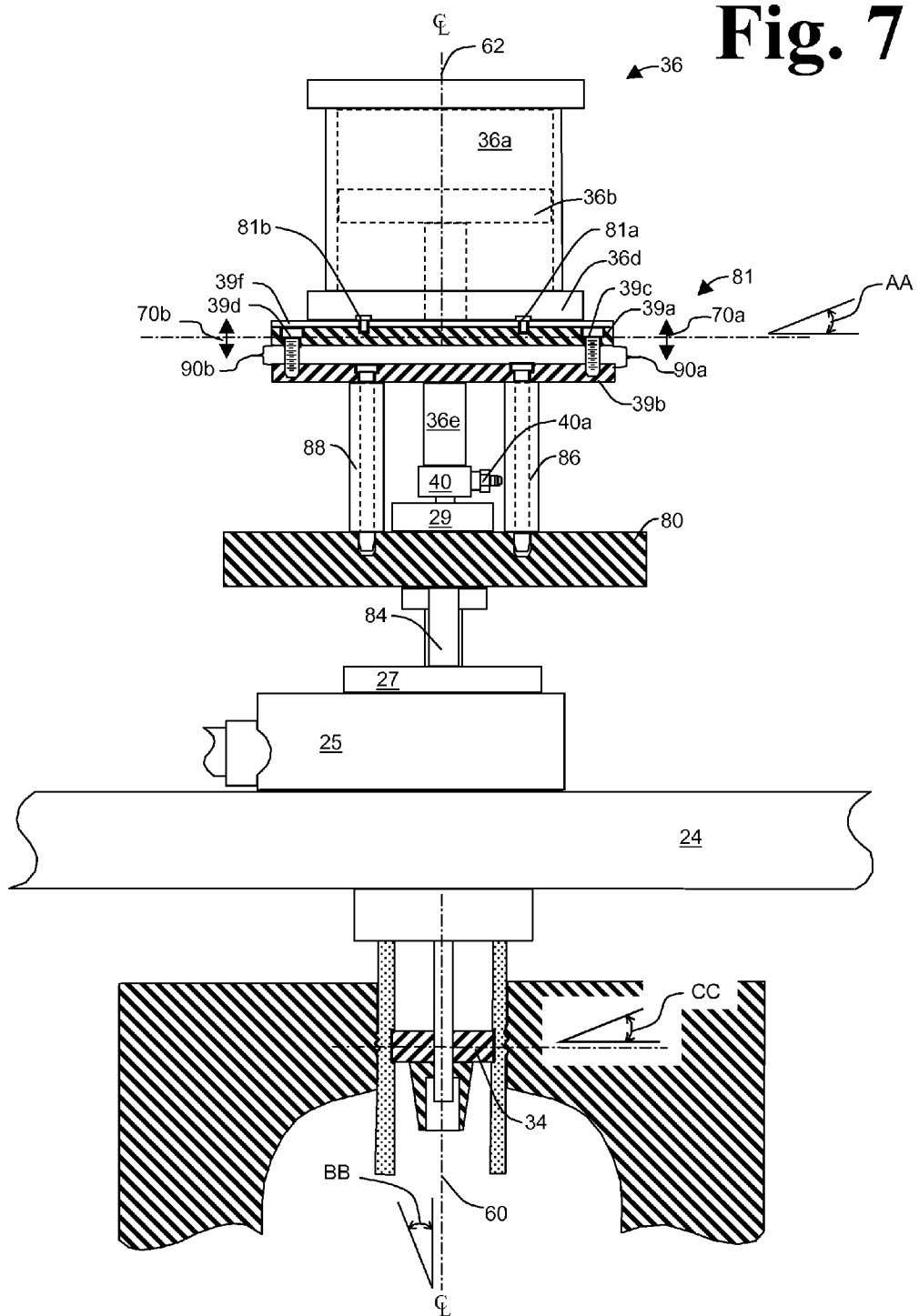
FIG. 7 illustrates an alternative arrangement of a blow molding apparatus in accordance with the invention.

An alternative means for adjusting angular orientation of an actuator mounting plate is illustrated in FIG. 7 in which components corresponding to those illustrated in FIGS. 2, 3 and 5 bear the same reference numbers. In FIG. 7, actuator mounting assembly 81 comprises an actuator mounting member such as actuator mounting plate 39a, a support member such as base plate 39b, adjusting screws such as adjusting screws 39c and 39d and retainer such as retainer plate 39f. Actuator 36 is attached to actuator mounting plate 39a by fasteners (not shown). Actuator mounting plate 39a is attached to base plate 39b by adjusting members such as adjusting screws 39c, 39d and 39e. Base plate 39b is supported from mandrel adjust plate 80 by spacers, such as spacers 86 and 88, and is attached to mandrel adjust plate 80 by fasteners passing through such spacers. Separation of mounting plate assembly 81 from mandrel adjust plate 80 accommodates translation of adaptor 40 between the position where blow pin 30 is fully retracted and the position where blow pin 30 is fully advanced. Mandrel adjust plate 80 is attached to mandrel sleeve 27 by fasteners passing through spacers 82 and 84, mandrel sleeve 27 is attached to die block 25 by fasteners not shown in FIG. 7. As illustrated, mandrel adjust plate 80 is supported so as to provide separation between mandrel adjust plate 80 and die assembly 20. While such separation is known, other arrangements of die assembly 20 and mandrel adjust plate 80 are contemplated where the separation is greatly reduced or eliminated.

At least three adjusting screws such as adjusting screws 39c and 39d are interposed between actuator 36 and die assembly 20, the adjusting screws comprising actuator mounting assembly 81 and being arranged to effect adjustment of orientation of actuator mounting plate 39a (FIG. 8a), and hence, orientation of actuator 36. Advantageously, four adjusting screws, each located proximate a corner of actuator mounting plate 39a could be used to determine the orientation of actuator mounting plate 39a. A threaded portion of each adjusting screw engages threaded openings, such as openings 39bc and 39ba (FIG. 8a), in base plate 39b and passes through a clearance hole in actuator mounting plate 39a. Retainer plate 39f is attached to actuator mounting plate by fasteners, such as screws 81a and 81b passing through holes in retainer plate 39f and engaging threaded bores in actuator mounting plate 39a. Retainer plate 39f provides access for rotation of the adjusting screws by openings through retainer plate 39f such as openings 39fa, 39fb, and 39fc (FIG. 8b). Retainer plate 39f retains the adjusting screws in actuator mounting plate 39a so as to maintain abutment of a shoulder of each screw with a shoulder of a counter bore such as counter bores 39aa, 39ab and 39ac (FIG. 8a) in which the adjusting screw is received.

Rotation of an adjusting screw alters separation of the actuator mounting plate from the base plate along the longitudinal axis of the adjusting screw. Orientation of the actuator mounting plate 39a, as represented by two tilt angles AA lying in perpendicular planes, is determined by at least three offsets, each contributing to orientation of actuator 36, provided the not all three offsets lie in the same plane. Offsets such as offsets 90a and 90b (FIG. 7) of mounting plate 39a from base plate 39b are determined by the relative positions of actuator mounting plate 39a and base plate 39b along the lengths of the adjusting screws. Rotation of an adjusting screw is effective to translate actuator mounting plate 39a relative to base plate 39b, as represented by arrows 70a and 70b, thereby determining the length of an offset along the length of the adjusting screw. By virtue of the construction of actuator 36, orientation of actuator mounting plate 39a determines orientation of the centerline 62 of actuator 36 and of actuator rod 36e. Further, as a consequence of rigid connection of blow pin shaft 32 to actuator rod 36e, orientation of actuator mounting plate 39a determines orientation of blow pin shaft 32 relative to centerline 60 as represented by angle BB. Still further, as a consequence of attachment of blow pin 30 to blow pin shaft 32, angular orientation AA of actuator mounting plate 39a determines orientation of collar 34 relative to a plane transverse to the neck region of mold cavity 16 as represented by angle CC. Lengths of the offsets, such as offsets 90a and 90b are set to establish an orientation of actuator mounting plate 39a to achieve substantial parallelism of collar 34 to a transverse plane through the neck portion of mold cavity 16 and substantial parallelism of blow pin shaft 32 with centerline 60.

Figure 8A:
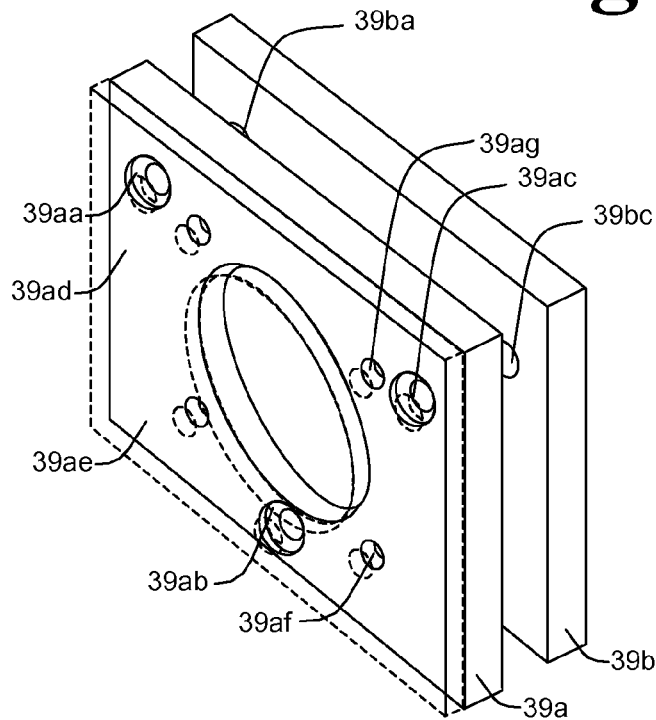
FIGS. 8a and 8b illustrate components of an actuator mounting assembly of FIG. 7.
Figure 8B:
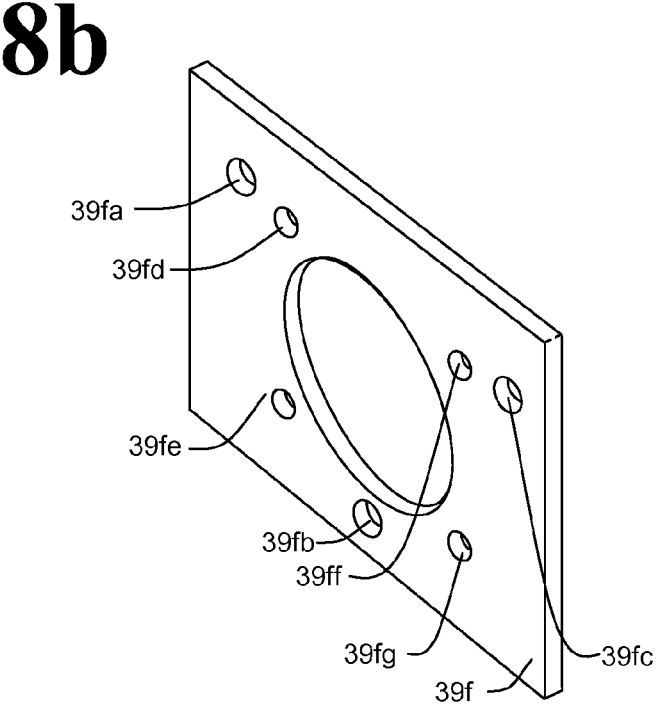

Referring to FIG. 8a, the arrangement of retainer plate 39f, actuator mounting plate 39a and base plate 39b comprising actuator mounting assembly 81 is illustrated. Retainer plate 39f is shown in phantom (dashed) abutting actuator mounting plate 39a. Each of cylinder retainer plate 39f, actuator mounting plate 39a and base plate 39b have a central opening through which actuator rod 36e passes. Access holes 39fa, 39fb, and 39fc (FIG. 8b) through retainer plate 39f permit rotation of adjusting screws with retainer plate 39f joined to actuator mounting plate 39a. The threaded portions of fasteners for joining retainer plate 39f to actuator mounting plate 39a pass through openings 39fd, 39fe, 39ff and 39fg through retainer plate 39f and engage threads in bores 39ad, 39ae, 39af and 39ag in actuator mounting plate 39a.

Although the invention has been described with reference to preferred embodiments, variations from particulars of the preferred embodiments and consistent with the invention will be recognized by those skilled in the art. In particular, it is noted that the showing of the blow pin and collar are illustrative only of a construction providing a seal at the opening of the parison and advantageously suitable for supporting the sidewalls of the parison for formation of a neck "finish" by forces applied by molding members to the parison. Further, while the arrangement of a mandrel, mandrel sleeve and mandrel adjusting elements are consistent with known devices, the invention is suitable for application to any arrangement of a mandrel through which a blow pin shaft passes where parallelism of the blow pin shaft with the centerline of the passage through the mandrel is effective to prevent binding of the blow pin shaft with the mandrel. Still further, while the actuator has been described as including a piston and cylinder arrangement, the invention is suitable for application to any arrangement of an actuator and blow pin shaft wherein orientation of the actuator affects orientation of the blow pin shaft and blow pin in ways that affect operation of the blow pin shaft and sealing engagement of the blow pin with a parison. Still further, while the invention has been illustrated with reference to a container and mold members for forming the container as illustrated, the invention is suitable for use with blow molding apparatus for producing containers differing substantially from the container illustrated and for producing articles other than containers.

What is claimed is:

1. An apparatus for blow molding wherein a tubular parison extruded from material passing through an annular opening of a forming die is captured in a mold assembly comprising a mold cavity so as to close one end of the parison to permit expansion thereof by pressurizing the parison within the mold cavity, the apparatus comprising a blow pin for conducting the pressurized fluid from a source thereof into the parison, an actuator comprising an actuator rod for advancing the blow pin to an advanced position achieving sealing engagement of the blow pin and an opening in the parison and for retracting the blow pin to a retracted position removed from the opening in the parison, a blow pin shaft supporting the blow pin and connected to the actuator rod and passing through the forming die internally of the annular opening thereof and adjusting means for determining the orientation of the actuator to achieve substantial parallelism of the blow pin shaft and the centerline of the opening through the forming die through which the blow pin shaft passes and to achieve substantial parallelism of a sealing element of the blow pin with a plane transverse to the opening of the parison.

2. The apparatus according to claim 1 wherein the adjusting means comprise at least three adjusting members interposed between the actuator and the forming die, each adjusting member suitable for establishing an offset relative to a reference surface, the offset contributing to orientation of the actuator.

3. The apparatus according to claim 2 wherein each adjusting member comprises a threaded portion engaged with at least one of an actuator mounting member to which the actuator is attached and a support member so that rotation of the adjusting member is converted to relative translation of the actuator mounting member and support member whereby the offset of the actuator mounting member from the support member is established.

4. The apparatus according to claim 3 wherein each adjusting member comprises an adjustable support having two threaded portions, the threaded portions being of opposite orientation, wherein one threaded portion engages the actuator mounting member and the other threaded portion engages the support member.

5. The apparatus according to claim 4 wherein each adjustable support comprises a grip segment to facilitate rotation of the adjustable support.

6. The apparatus according to claim 3 wherein the support member comprises a mandrel adjust plate spaced from the actuator mounting member by a distance at least equal to the distance between the advanced position of the blow pin and the retracted position of the blow pin.

7. The apparatus according to claim 6 wherein the forming die comprises a die assembly and the mandrel adjust plate is spaced from and attached to a member of the die assembly.

8. The apparatus according to claim 3 wherein each adjusting member comprises an adjusting screw having a threaded portion passing through a clearance hole in an actuator mounting member and engaging a support member and the adjusting means further comprises a retainer attached to the mounting member for maintaining abutment of a shoulder of the adjusting screw with a shoulder of a counter bore in the actuator mounting member in which the adjusting screw is received so that rotation of the adjusting screw is converted to relative translation of the actuator mounting member and support member whereby offset of the actuator mounting member from the support member is established.

9. The apparatus according to claim 8 wherein the retainer further comprises access holes to permit rotation of adjusting screws with the retainer attached to the actuator mounting member.

10. The apparatus according to claim 8 wherein the support member is spaced from a mandrel adjust plate by a distance at least equal to the distance between the advanced position of the blow pin and the retracted position of the blow pin.

11. The apparatus according to claim 10 wherein the forming die comprises a die assembly and the mandrel adjust plate is spaced from and attached to a member of the die assembly.

* * * * *